US00RE39109E

(19) United States
(12) Reissued Patent
Majumdar et al.

(10) Patent Number: US RE39,109 E
(45) Date of Reissued Patent: May 30, 2006

(54) INVERTER CIRCUIT

(75) Inventors: Gorab Majumdar, Tokyo (JP); Mitsutaka Iwasaki, Tokyo (JP); Tooru Iwagami, Tokyo (JP); Khalid Hassan Hussein, Fukuoka (JP)

(73) Assignee: Mitsubishi Denki Kabushiki Kaisha, Tokyo (JP)

(21) Appl. No.: 10/434,081

(22) PCT Filed: Sep. 30, 1998

(86) PCT No.: PCT/JP98/04436

§ 371 (c)(1),
(2), (4) Date: May 30, 2000

(87) PCT Pub. No.: WO00/19591

PCT Pub. Date: Apr. 6, 2000

Related U.S. Patent Documents

Reissue of:
(64) Patent No.: 6,239,998
Issued: May 29, 2001
Appl. No.: 09/555,375
Filed: May 30, 2000

(51) Int. Cl.
*H02M 3/24* (2006.01)
*H02M 7/5387* (2006.01)

(52) U.S. Cl. ..... 363/98; 363/132
(58) Field of Classification Search ..... 363/16, 363/17, 95, 97, 98, 131, 132
See application file for complete search history.

(56) References Cited

U.S. PATENT DOCUMENTS

| | | | | | |
|---|---|---|---|---|---|
| 5,517,402 | A | * | 5/1996 | Ikeda et al. | 363/132 |
| 5,771,166 | A | * | 6/1998 | Lim | 363/132 |
| 5,805,438 | A | * | 9/1998 | Takada et al. | 363/98 |
| 5,880,950 | A | * | 3/1999 | Kim | 363/98 |

FOREIGN PATENT DOCUMENTS

| | | | |
|---|---|---|---|
| JP | 1-295621 | | 11/1989 |
| JP | 8-19164 | * | 1/1996 |
| JP | 9-219976 | | 8/1997 |
| JP | 9-285184 | * | 10/1997 |
| JP | 10-243664 | | 9/1998 |

* cited by examiner

*Primary Examiner*—Matthew V. Nguyen
(74) *Attorney, Agent, or Firm*—Oblon, Spivak, McClelland, Maier & Neustadt, P.C.

(57) ABSTRACT

An inverter circuit to reduce a resistor for overcurrent detection and decrease the number of filters in an inverter circuit for supply polyphase power. Transistors each having a current detection terminal and a protective diode for regenerative current are adopted as switching elements on an "L" side and their current detection terminals are connected in common to a resistor. Therefore, a voltage drop caused by a current flowing in the resisytor becomes larger when an overcurrent flows in at least one of the transistors and further when an overcurrent flows in a switching element on an "H" side even if no overcurrent flows in any one of the transistors.

14 Claims, 21 Drawing Sheets

INVERTER CIRCUIT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an inverter circuit, and more particularly to an inverter circuit supplying polyphase power.

2. Discussion of the Background

FIG. 20 is a circuit diagram showing a configuration of a background-art inverter circuit 1a and connection of the circuit 1a and peripheral devices. Terminals P and N on both ends of a smoothing capacitor 70 are connected to a not-shown electronic power rectifier which can employ a diode bridge and the like and supplied with substantially-direct current power therefrom. The inverter circuit 1a converts the substantially-direct current power into three-phase electric power and supplies this power for a load 71 such as a motor M.

In the inverter circuit 1a, on each "L" side of U-phase, V-phase and W-phase, i.e., on a side connected to the terminal N provided are IGBTs (Insulated Gate Bipolar Transistor: hereinafter, simply referred to as "transistor") 20F, 21F and 22F each with a protective diode for producing a regenerative current. On each "H" side of the U-phase, the V-phase and the W-phase, i.e., on a side connected to the terminal P provided are IGBTs 23F, 24F and 25F each with the protective diode. [Their] *The* gates of the transistors 20F, 21F, 22F, 23F, 24F and 25F are connected to a controller 10a, and specifically their operations are controlled by a driving circuit 12 included in the controller 10a. Supplied with an overcurrent signal by an overcurrent protective circuit 11, the driving circuit 12 controls the operations of the transistors so that no excess current may flow into the transistor in which an overcurrent possibly flows.

The possibility that an overcurrent flows in the transistor inverter can be detected as follows. Emitters of the transistors 20F, 21F and 22F on the "L" side are connected in common to one end of a resistor 30. A voltage drop caused by a current flowing in the resistor 30 is given to one input end of a comparator 13 through a low-pass filter 45 consisting of a resistor 47 and a capacitor 46. The other input end of the comparator 13 is connected to a power supply 14 for supplying a predetermined voltage Vref. An output of the comparator 13 is given to the overcurrent protective circuit 11. Therefore, when a current large enough to cause a voltage drop higher than the voltage Vref flows in the resistor 13, judging that an overcurrent flows in at least one of the transistors 20F, 21F and 22F, the overcurrent protecttive circuit 11 applies the overcurrent signal to the driving circuit 12. For example, the driving circuit 12 receives the overcurrent signal to turn off the transistors 20F, 21F and 22F.

Thus, the technique to detect an overcurrent by a DC bus detection system is disclosed in e.g., Japanese Patent Application Laid Open Gazette No. 7-298481.

FIG. 21 is a circuit diagram showing a configuration of another background-art inverter circuit 1b and connection of the circuit 1b and peripheral devices. As compared with the inverter circuit 1a, the transistors 20F, 21F and 22F on the "L" side are replaced by transistors 20S, 21S and 22S each comprising a current detection terminal as well as the protective diode. The current detection terminals of the transistors 20S, 21S and 22S are connected in common to the terminal N through resistors 30u, 30v and 30w, respectively.

The inverter circuit 1b comprises a controller 10b. The controller 10b has control units 10u, 10v and [low] *10w* corresponding to the respective phases, which control drivings of the transistors 20S, 21S and 22S, respectively. For example, the control unit 10u comprises a comparator 13u, an overcurrent protective circuit 11u and a driving circuit 12u.

One input end of the comparator 13u is connected to a power supply 14u for supplying the voltage Vref, and the other input end receives a voltage drop across the resistor 30u through a filter 45u having the same constitution as the filter 45 connected to the inverter 1a.

The overcurrent protective circuit 11u gives overcurrent information to the driving circuit 12u on the basis of an output from the comparator 13u. For example, when the voltage drop across the resister 30u is higher than the voltage Vref, judging that an ovecurrent flows in the transistors 20S, the driving circuit 12u given the overcurrent information from the overcurrent protective 11u turns off the transistor 20S. Similarly, the other control units 10v and 10w monitor voltage drops across the resistors 30v and 30w through filters 45v and 45w to control operations of the transistors 21S and 22S, respectively.

Thus, the technique to detect an overcurrent by phase-current detection system using transistors having current detection terminals is disclosed in e.g. Japanese Patent Application Laid Open Gazette No. 9-219976.

The background-art technique to detect an overcurrent by the DC bus detection system has a problem that a loss across the resistor 30 becomes larger since a current flowing in a bus connected to the transistors 20F, 21F and 22F causes the voltage drop across the [transistor] *resistor* 30. Further, as the resistor 30, it is necessary to adopt a high-power resistor, so it disadvantageously costs high. Moreover, it is not easy to incorporate such a resistor in the inverter circuit 1a and it is necessary to separately provide the resistor outside the inverter circuit 1a.

The background-art technique to detect an overcurrent by the phase-current detection system has a problem that it is impossible to reduce the size of the inverter circuit 1b since the respective current detection terminals of the transistors 20S, 21S and 22S are connected to the controller 10b to increase the number of interconnection lines. Further, in order to transfer the voltage drops across the resistors 30u, 30v and 30w to the control units 10u, 10v and 10w while avoiding an effect of noise, it is necessary to provide the filters 45u, 45v and 45w corresponding to the respective phases.

SUMMARY OF THE INVENTION

An object of the present invention is to solve the above problems by reducing the [resistor] *losses and the number of resistors* for overcurrent detection and decreasing the number of filters.

The first aspect of an inverter circuit in accordance with the present invention is characterized in that the inverter connected to first and second terminals which are given a substantially-direct current and supplying polyphase power comprises: a plurality of switching elements on a first side, each including a first end connected to the first terminal, a second end and a regenerative current element provided between the first and second ends; a plurality of switching elements on a second side, each including a first end, a second end connected to the second terminal, a regenerative current element provided between the first and second ends thereof and a current detection terminal for detecting a current flowing therein; a resistive device developing a voltage drop by a sum of currents flowing in the [second ends] *current detection terminals* of the plurality of switching elements on the second side; and a driving circuit for controlling a driving operation on the plurality of switching elements on the second side on the basis of a comparison result between the voltage drop and a predetermined voltage, and the second ends of the plurality of switching elements on the first side and the first ends of the plurality of switching elements on the second side are connected to output the polyphase power.

The second aspect of the inverter circuit in accordance with the present invention is the first aspect of the inverter circuit, which is characterized in that the resistive device and the driving circuit are integrated.

The third aspect of the inverter circuit in accordance with the present invention is the first aspect of the inverter circuit, which is characterized in that the resistive device is integrated with at least one of the plurality of switching elements on the second side.

The fourth aspect of the inverter circuit in accordance with the present invention is the third aspect of the inverter circuit, which is characterized in that the resistive device is integrated with one of the plurality of switching elements on the second side.

The fifth aspect of the inverter circuit in accordance with the present invention is the third aspect of the inverter circuit, which is characterized in that the resistive device consists of a plurality of resistive elements connected in parallel as many as the plurality of switching elements on the second side, and the plurality of resistive elements are integrated with the plurality of switching elements on the second side, respectively.

The sixth aspect of the inverter circuit in accordance with the present invention is the first aspect of the inverter circuit, which is characterized in that the inverter circuit further comprises: a comparator for comparing the voltage drop with the predetermined voltage.

The seventh aspect of the inverter circuit in accordance with the present invention is the sixth aspect of the inverter circuit, which is characterized in that the inverter circuit further comprises: a filter for giving the voltage drop with noise cut to the comparator.

The eighth aspect of the inverter circuit in accordance with the present invention is the seventh aspect of the inverter circuit, which is characterized in that the filter is integrated with the comparator.

The ninth aspect of the inverter circuit in accordance with the present invention is the seventh aspect of the inverter circuit, which is characterized in that the filter is integrated with the driving circuit.

The tenth aspect of the inverter circuit in accordance with the present invention is the sixth aspect of the inverter circuit, which is characterized in that the inverter circuit further comprises: a power supply, and the predetermined voltage is divided by second and third resistive devices and applied to the comparator.

The eleventh aspect of the inverter circuit in accordance with the present invention is the tenth aspect of the inverter circuit, which is characterized in that the second and third resistive devices are integrated with the comparator.

The twelfth aspect of the inverter circuit in accordance with the present invention is the tenth aspect of the inverter circuit, which is characterized in that the second resistive device is externally provided.

The thirteenth aspect of the inverter circuit in accordance with the present invention is the twelfth aspect of the inverter circuit, which is characterized in that the resistance value of the second resistive device is variable.

The fourteenth aspect of the inverter circuit in accordance with the present invention is the twelfth aspect of the inverter circuit, which is characterized in that the third resistive device is externally provided.

In the inverter circuit of the first to sixth aspects of the present invention, since it is possible to adopt a resistor whose loss is smaller than the resistor adopted in the technique to detect the overcurrent by the background-art DC bus detection system, the resistor of the present invention can be integrated together with other elements.

In the inverter circuit of the seventh to ninth aspects of the present invention, the interconnection is simpler than that in the technique to detect the overcurrent by the background-art phase-current detection system and only one filter is needed to defend the voltage drop reflecting the overcurrent against noise. Therefore the filter 45 can be also integrated together with other elements.

In the inverter circuit of the tenth and eleventh aspects of the present invention, it is possible to appropriately set a reference voltage for the voltage drop reflecting the overcurrent.

In the inverter circuit of the twelfth to fourteenth aspects of the present invention, it is possible to externally control the reference voltage.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The First Preferred Embodiment

Figure 1:
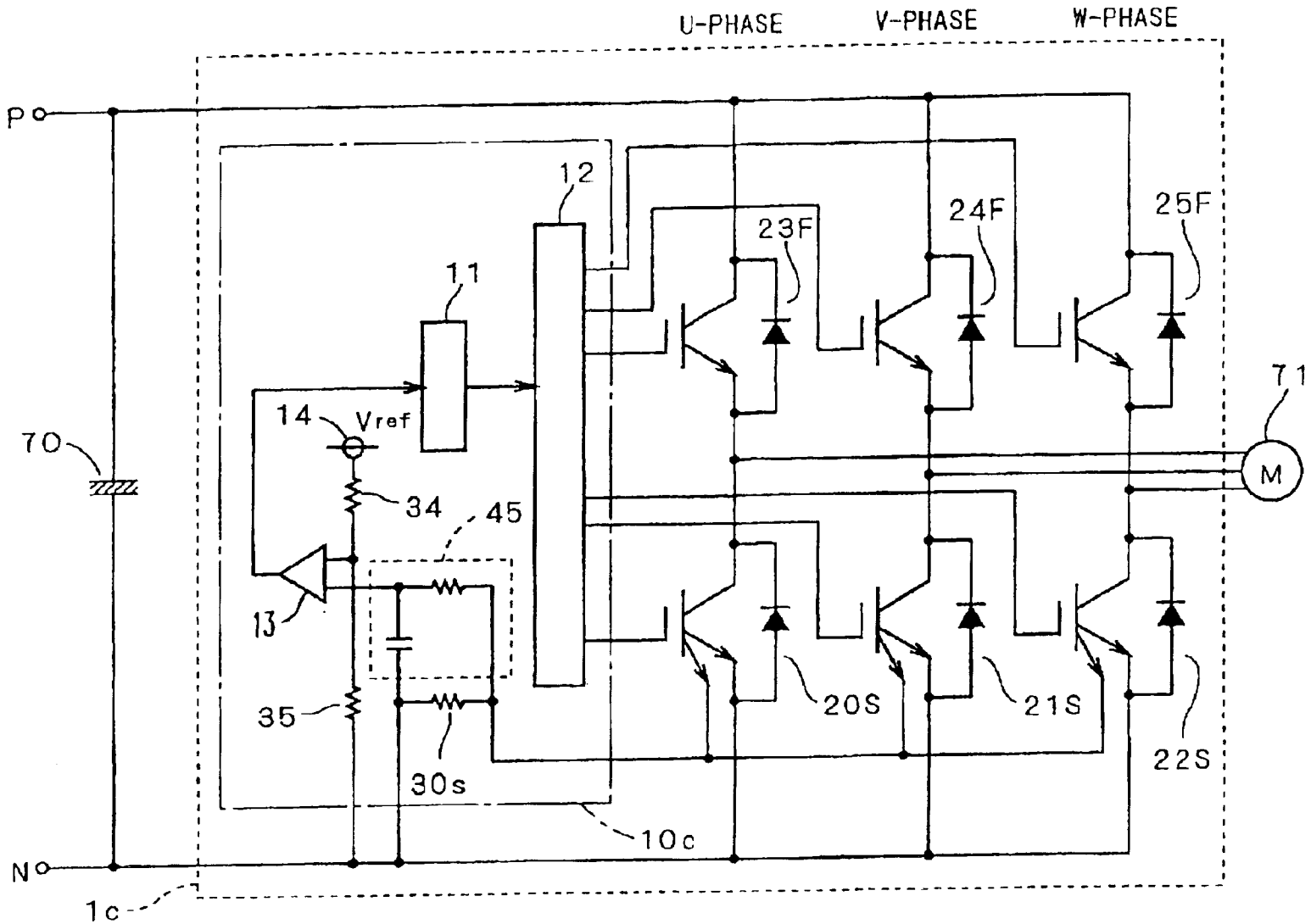
FIG. 1 is a circuit diagram showing a configuration of an inverter circuit in accordance with a first preferred embodiment of the present invention.

FIG. 1 is a circuit diagram showing a configuration of an inverter circuit 1c in accordance with the first preferred embodiment of the present invention. The terminals P and N on the both ends of the smoothing capacitor 70 are connected to a not-shown electronic power rectifier which can employ a diode bridge and the like and supplied with substantially-direct curent power therefrom. The inverter circuit 1c converts this substantially-direct current power into three-phase electric power and supplies this power for the load 71 such as the motor M.

In the inverter circuit 1c, on each "L" side of U-phase, V-phase and W-phase provided are the transistors 20S, 21S and 22S each with a protective diode and a current detection terminal. On each "H" side of U-phase, V-phase and W-phase provided are the transistors 23F, 24F and 25F each with a protective diode. In respective phases, the tansistors 20S and 23F, the transistors 21S and 24F and the transistors 22S and 25F are connected in series to each other between the terminals P and N. Specifically emitters of the transistors 20S, 21S ad 22S are connected in common to the terminal N and collectors of the transistors 23F, 24F and 25F are connected in common to the terminal P.

The U-phase of the load 71 is connected to a node between a collector of the transistor 20S and an emitter of the transistor 23F, the V-phase of the load 71 is connected to a node between a collector of the transistor 21S and an emitter of the transistor 24F and the W-phase of the load 71 is connected to a node between a collector of the transistor 22S and an emitter of the transistor 25F.

[Their] *The* gates of the transistors 20S, 21S, 22S, 23F, 24F and 25F are connected to a controller 10c, and specifically their operations are controlled by the driving circuit 12 included in the controller 10c.

Figure 20:
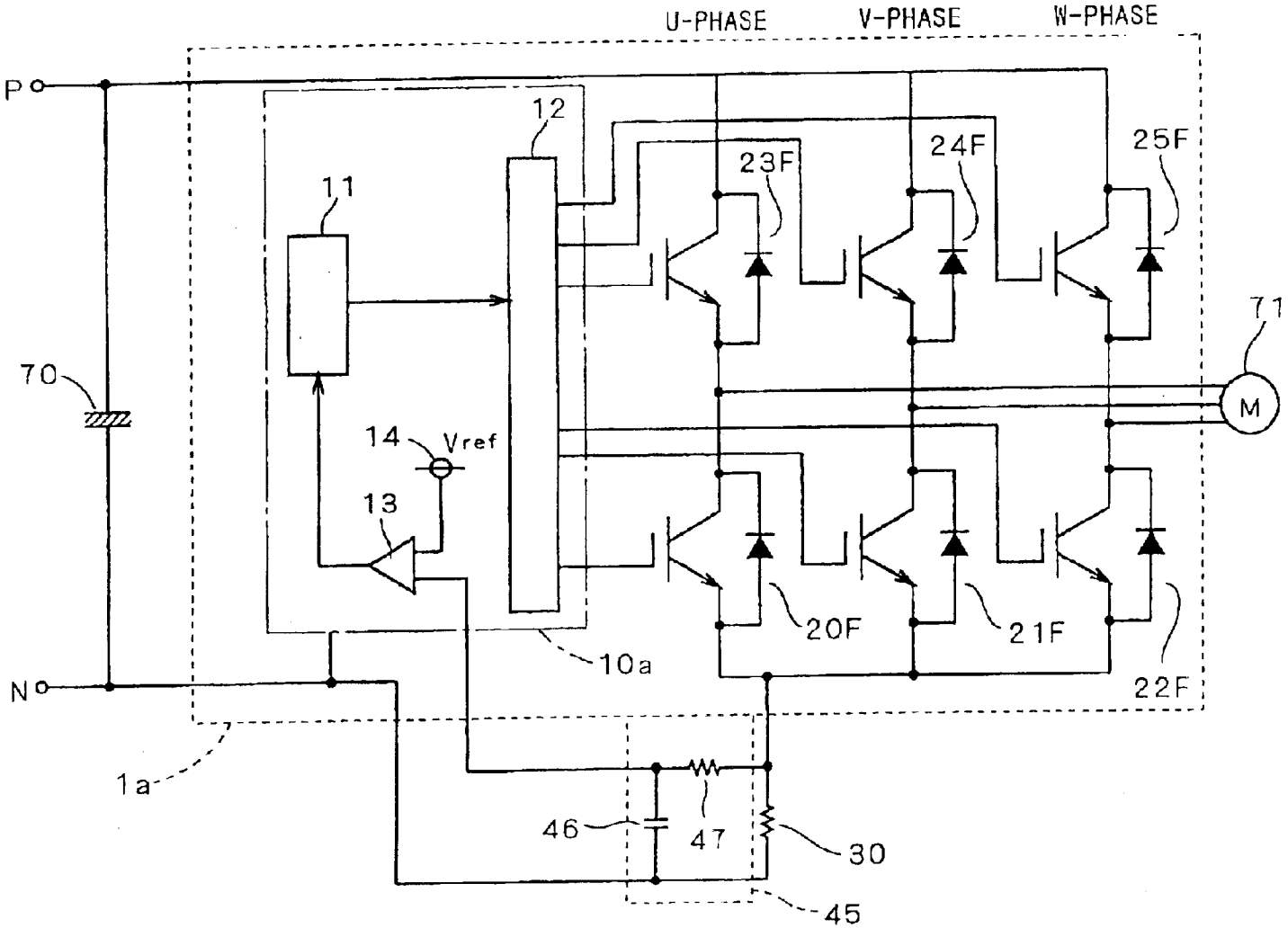
FIGS. 20 and 21 and are circuit diagrams showing configurations of inverter circuits in the background art.
Figure 21:
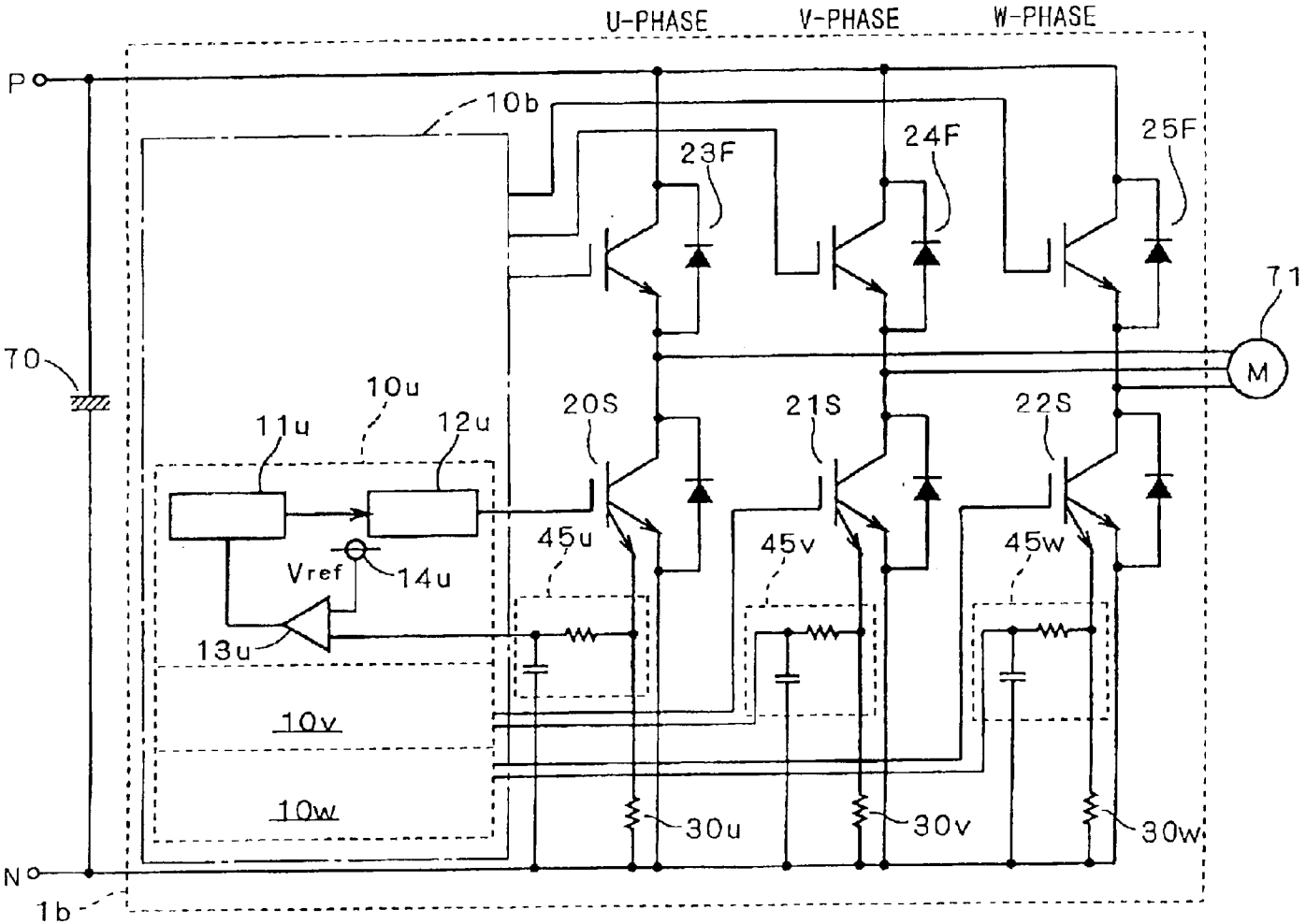

In the controller 10c, one end of a resistor 30s is connected to the terminal N and the other end is connected to the current detection terminals of the tansistors 20S, 21S and 22S. A voltage drop across the resister 30s is cleared of noise by the filter 45 and given to one input end of the comparator 13, the filter 45 is a low-pass filter, and can be easily constituted of the resistor 47 and the capacitor 46, for example, as shown in FIG. 20.

The other input end of the comparator 13 is given a voltage obtained by dividing the voltage Vref supplied from the power supply 14 by resistors 34 and 35 as a reference voltage. The overcurrent protective circuit 11 gives the overcurrent information to the driving circuit 12 on the basis of the output of the comparator 13. The driving circuit 12 controls the operation of the transistors on the basis of the overcurrent information.

When an overcurrent flows in any one of the transistors 20S, 21S and 22S, a large current corresponding to the overcurrent is carried to the resistor 30s from the current detection terminal of the transistor in which the overcurrent flows. Since the current flowing in the resister 30s is smaller than that in the technique to detect the overcurrent by the background-art DC bus detection system, however, the loss is smaller and it is not necessary to adopt a high-power resistor. Therefore, it is possible to incorporate the resistor 30s in the controller 10c, or further to integrate the controller 10c on the whole. To detect that the overcurrent flows in the transistors 20S, 21S and 22S by the voltage drop across the resistor 30s, the reference voltage obtained by dividing the voltage Vref by the resistors 34 and 35 is given to the comparator 13.

As compared with the technique to detect the overcurrent by the background-art phase-current detection system, since the respective current detection terminals of the transistors 20S, 21S and 22S are in common to the controller 10c, the interconnection is not complicated and only one filter 45 is needed to suppress noise. Therefore, the filter 45 can be also incorporated in the controller 10c, or further the controller 10c can be integrated on the whole.

Supplied with the overcurrent signal from the overcurrent protective circuit 11, the driving circuit 12 controls the operations of the transistors so that no current may flow into the transistor in which the overcurrent possibly flows. For example, the driving circuit 12 turns off all the transistors 20S, 21S and 22S.

Figure 2:
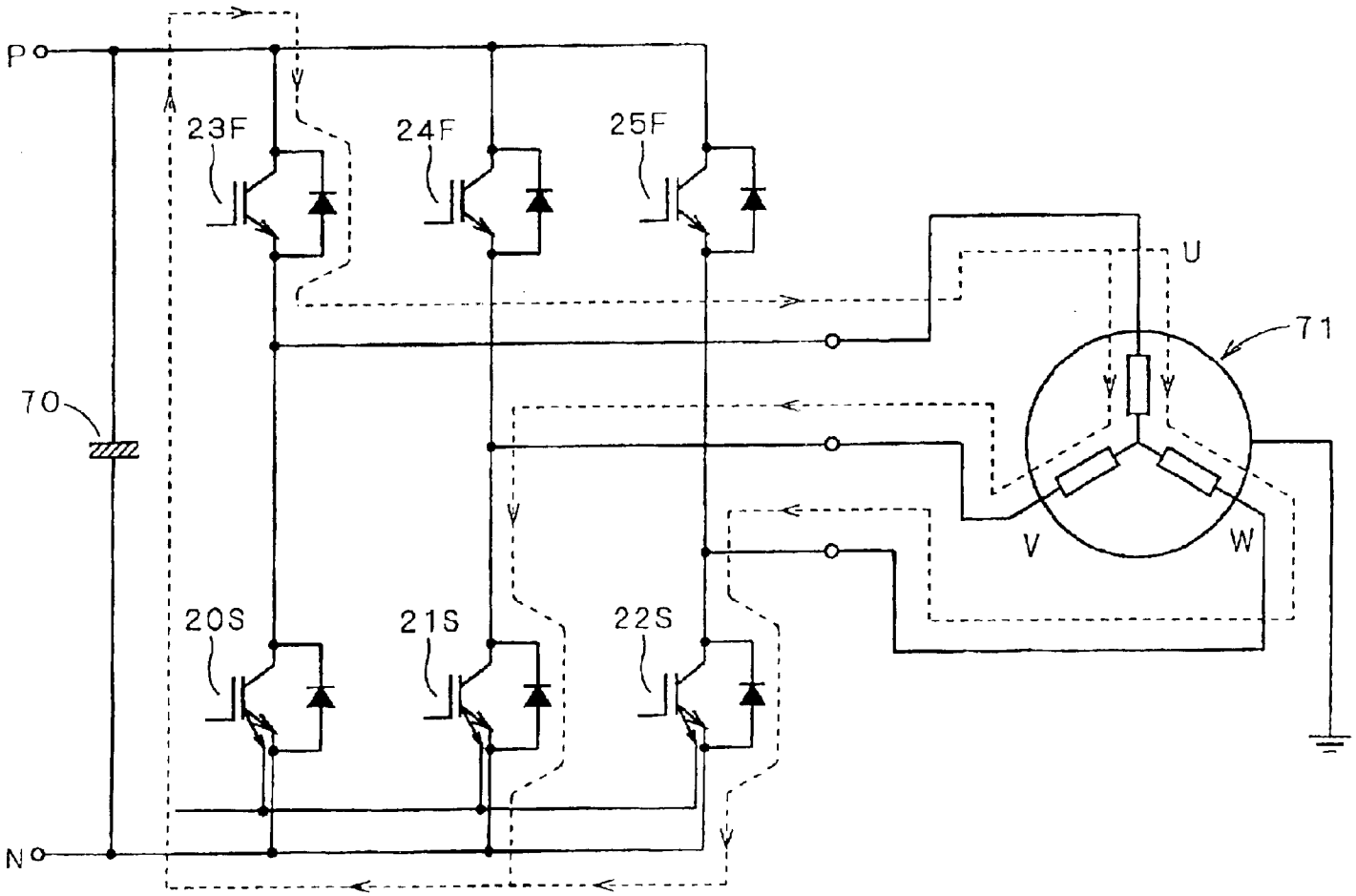
FIGS. 2 to 15 are circuit diagrams showing an operation of the inverter circuit in accordance with the first preferred embodiment of the present invention.
Figure 3:
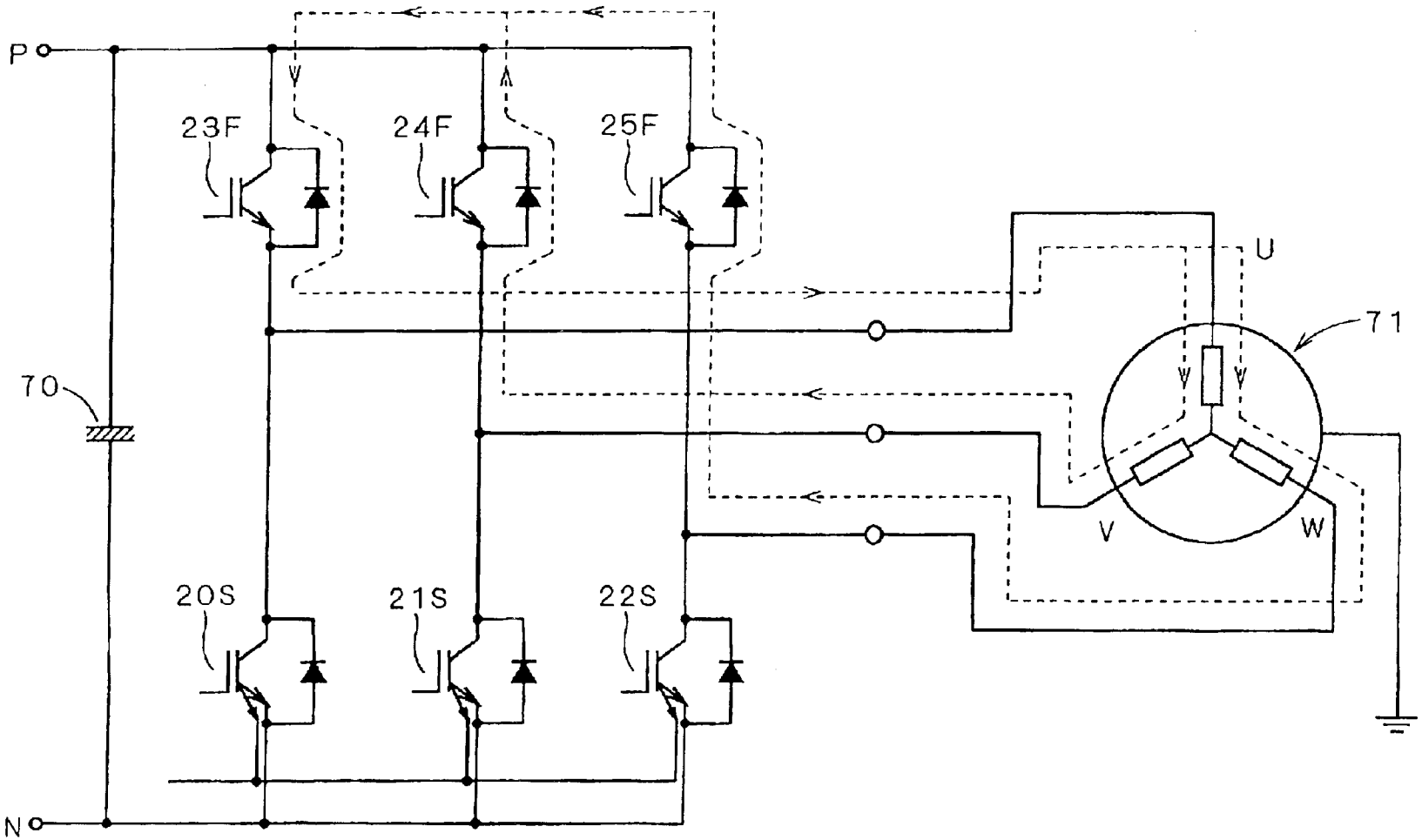
Figure 4:
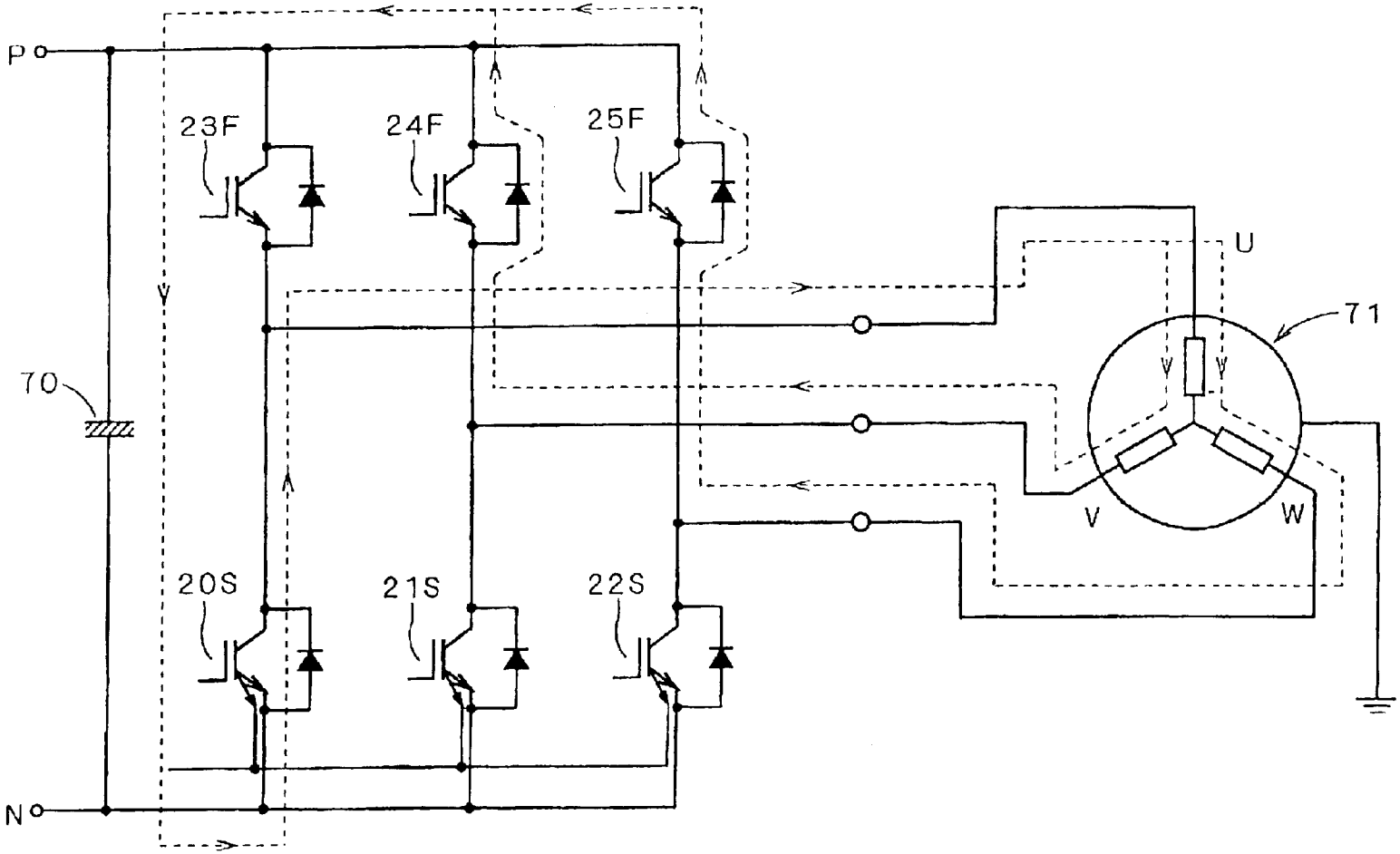

FIGS. 2 to 4 are circuit diagrams showing one of operation patterns in accordance with this preferred embodiment of the present invention. In FIGS. 2 to 4, the controller 10c is omitted. Broken lines represent flows of a current. It is assumed that the amount of current which can flow in the transistor in each of the phases is 25 amperes maximum. Accordingly, when a current over 25 amperes flows in any one of the transistors, an overcurrent flows in the transistor.

FIG. 2 shows a case where a current flows from the U-phase to the V-phase and W-phase and a current separately flows into the transistors 21S and 22S from the transistor 23F throught the load 71. When a current of 15 amperes flows in each of the transistors 21S and 22S, an overcurrent of 30 amperes flows in the transistor 23F. In this case, the current of 30 amperes flows in the resistor 30s of the controller 10c shown in FIG. 1, across which the voltage drop is large, and the driving circuit 12 turns off all the tansistors 20S, 21S and 22S with the overcurrent. In other words, monitoring only the transistors on the "L" side makes it possible to detect that the overcurrent flows in the transistors on the "H" side.

FIG. 3 shows a case where the driving of the transistors on the "H" side is kept after the overcurrent flows in the transistor 23F, and FIG. 4 shows a case where all the transistors on the "H" side are also turned off. A regenerative current flows through the transistors 23F, 24F [and 25F] (exactly, the protective diode of the transistor [25F] *24F*) *and 25F* (*exactly, the protective diode of the transistor 25F*) on the "H" side in the case of FIG. 3, and through the respective protective diodes of the transistors 20S, 24F and 25F in the case of FIG. 4.

Figure 5:
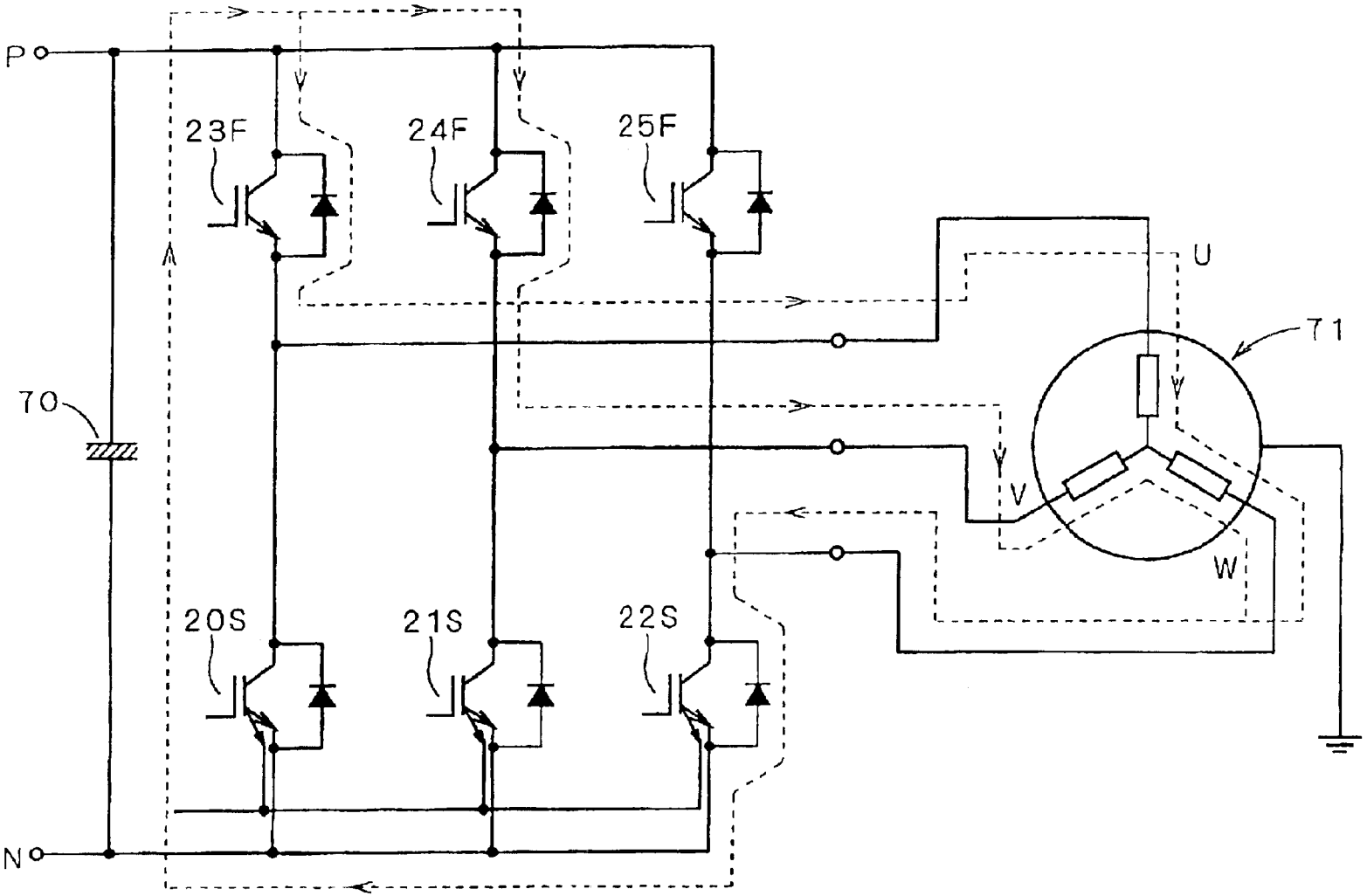
Figure 6:
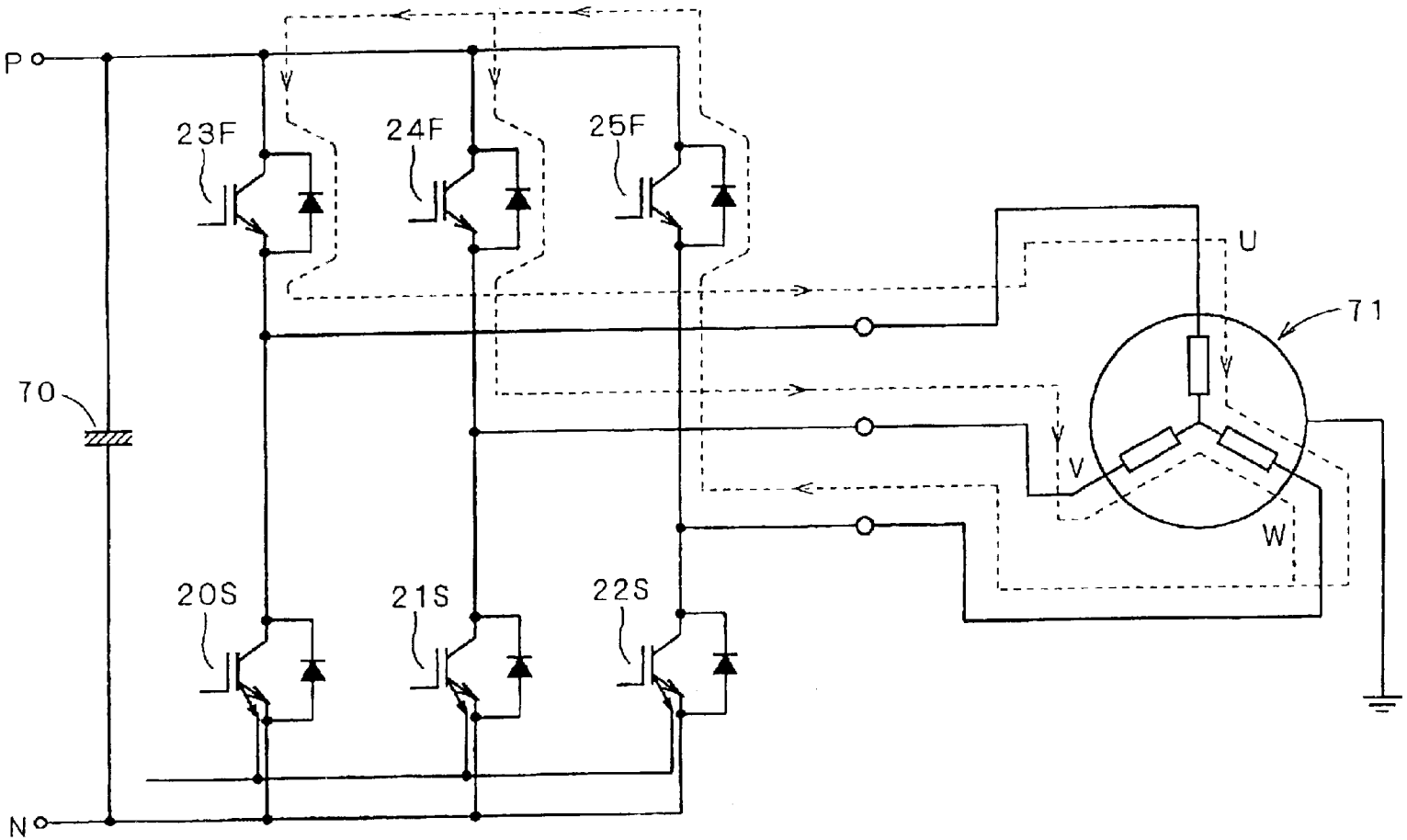
Figure 7:
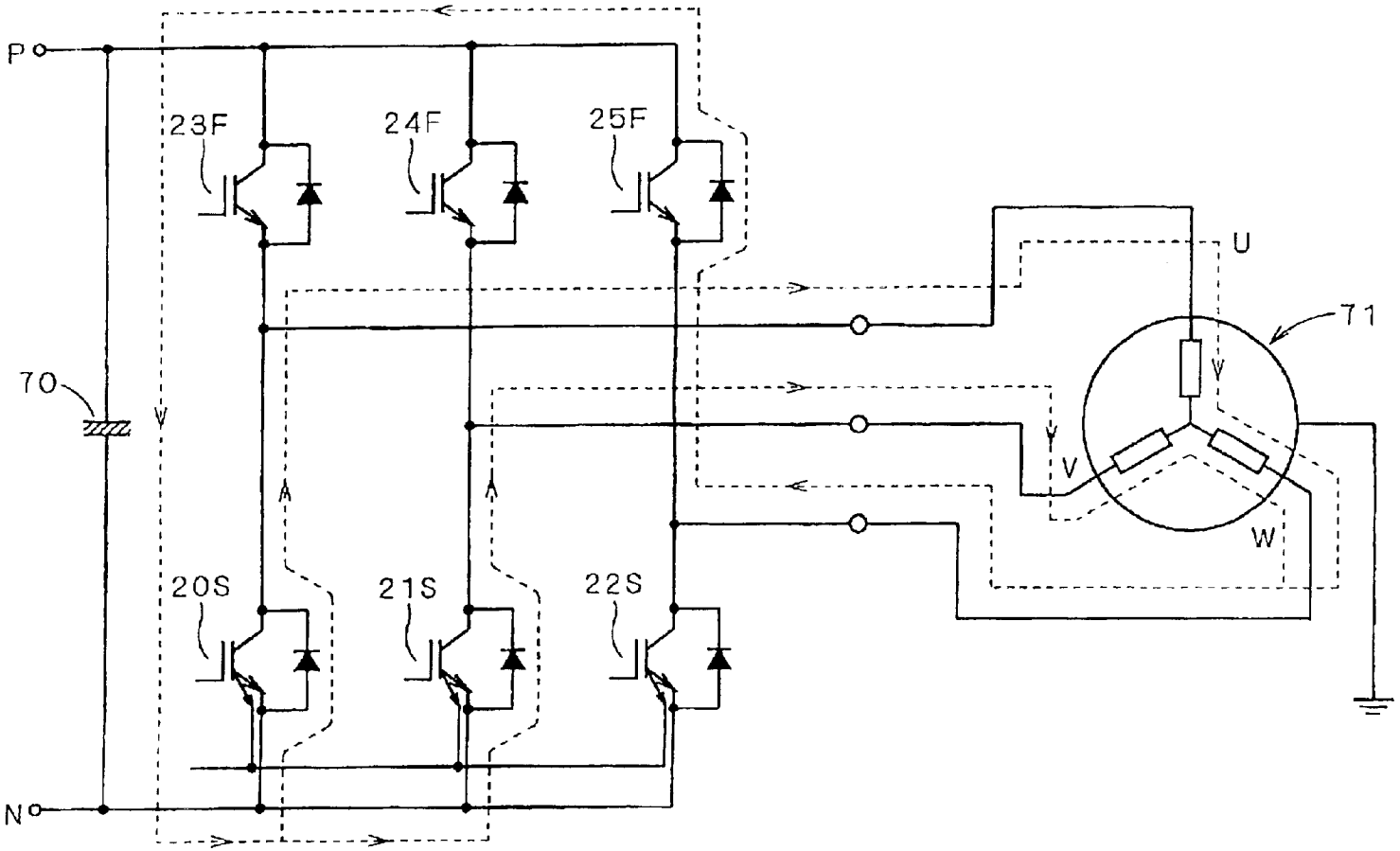

FIGS. 5 to 7 are circuit diagrams showing another operation pattern in accordance with this preferred embodiment of the present invention, and use the same representation as FIG. 2. FIG. 5 shows a case where a current flows from the U-Phase and V-phase to the W-phase, and further through the transistors 23F and 24F and then the load 71 to the transistor 22S. When a current of 15 amperes flows in each of the transistors 23F and 24F, an overcurrent of 30 amperes flows in the transistor 22S. Also in this case, naturally, the driving circuit 12 can turn off all the transistors 20S, 21S and 22S.

FIG. 6 shows a case where the driving of the transistors on the "H" side is kept after the overcurrent flows in the transistor 22S, and FIG. 7 shows a case where all the transistors on the "H" side are also turned off. A regenerative current flows tghfough the transistors 23F, 24F and 25F on the "H" side in the case of FIG. 6, and through the respective protective diodes of the transistors 20S, 21S and 25F in the case of FIG. 7.

Figure 8:
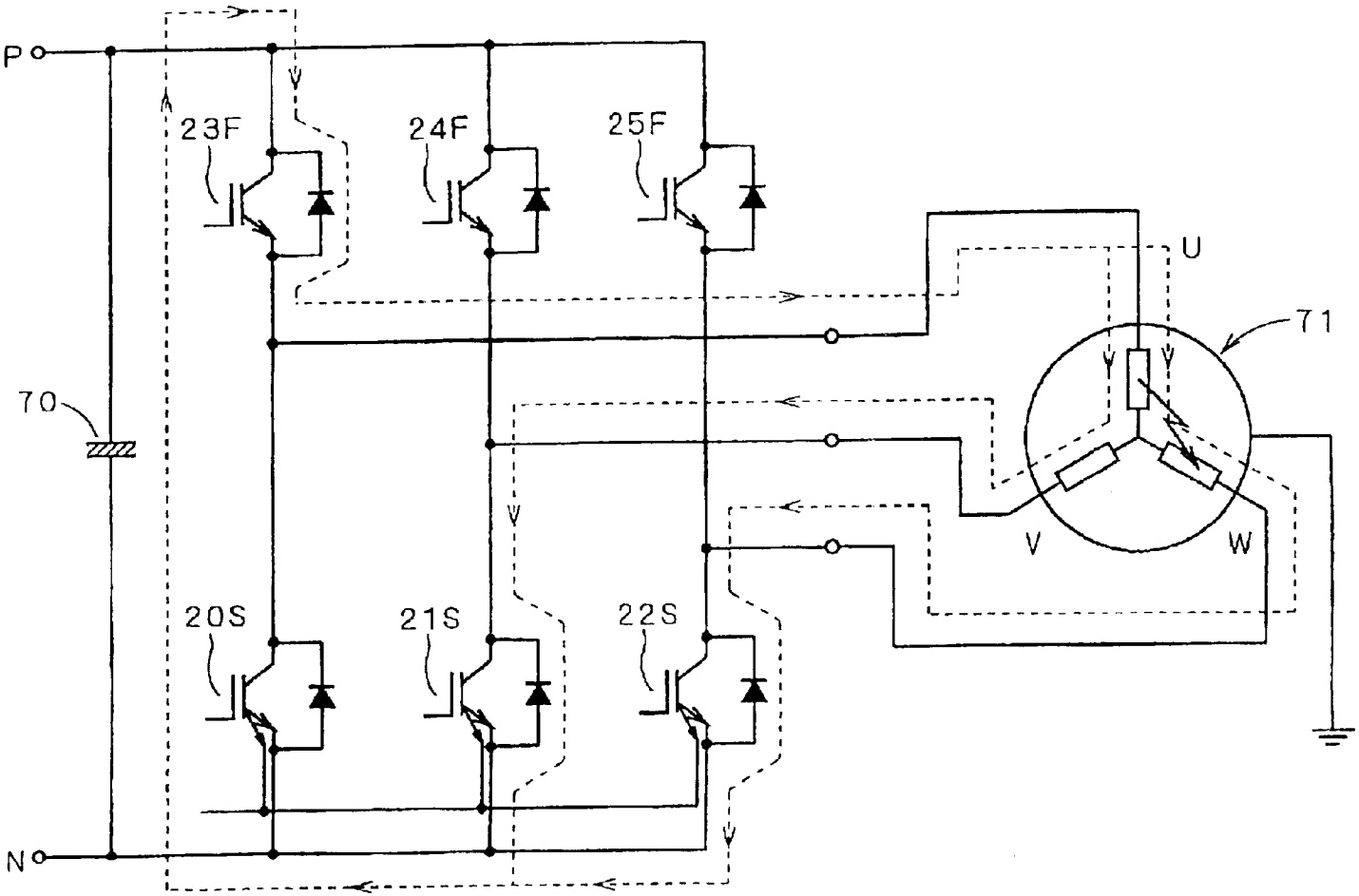
Figure 9:
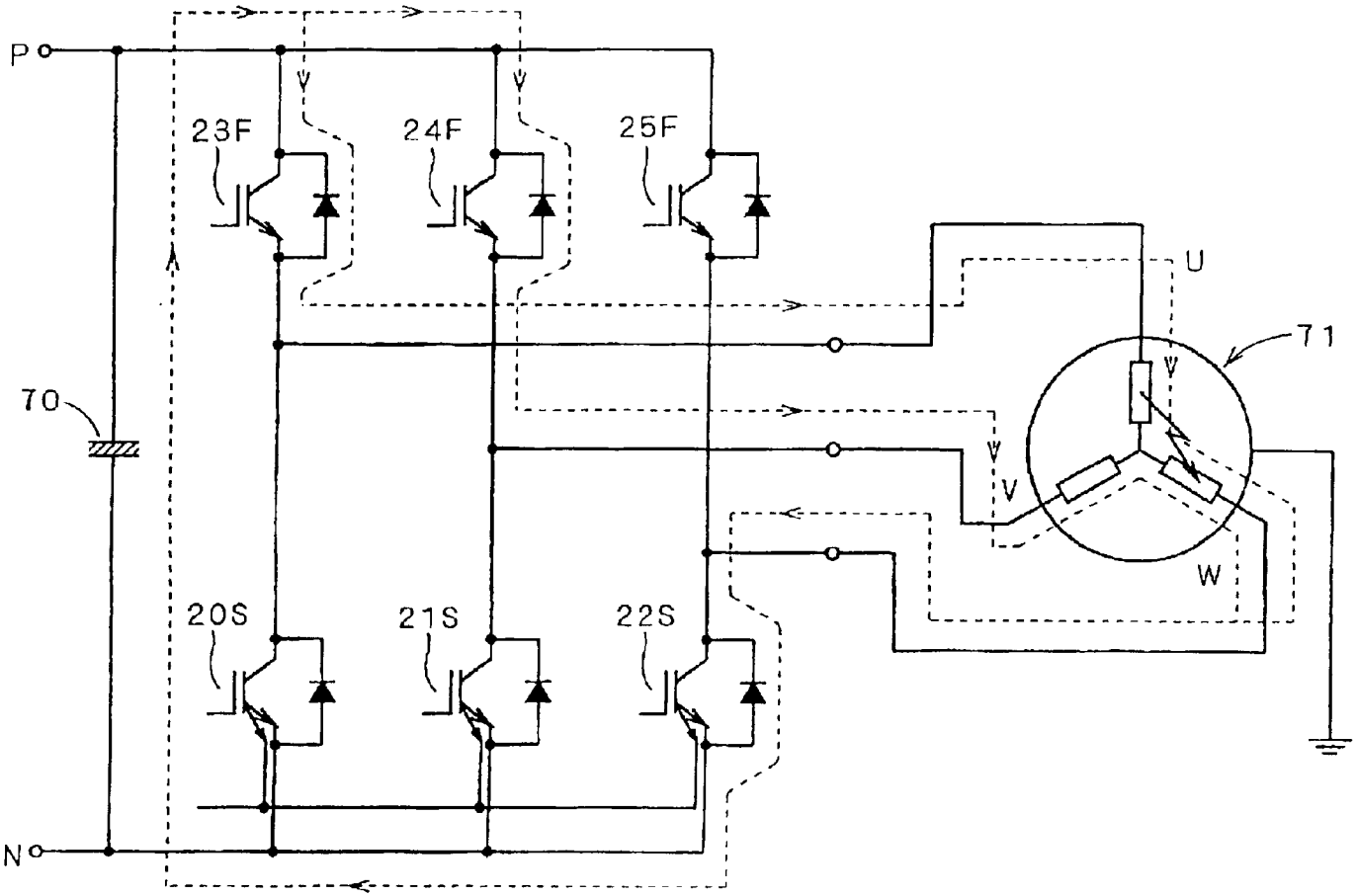
Figure 10:
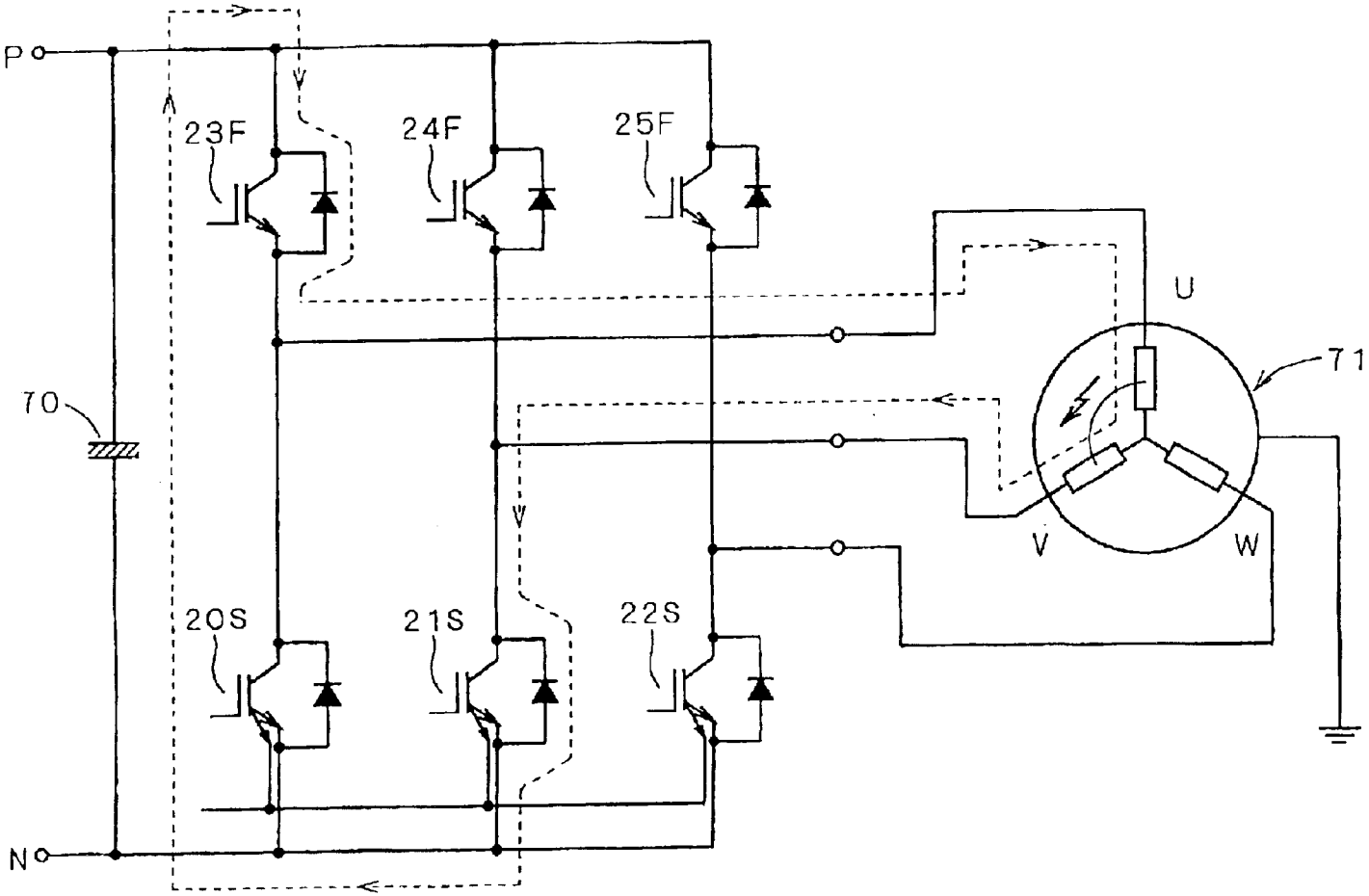
Figure 11:
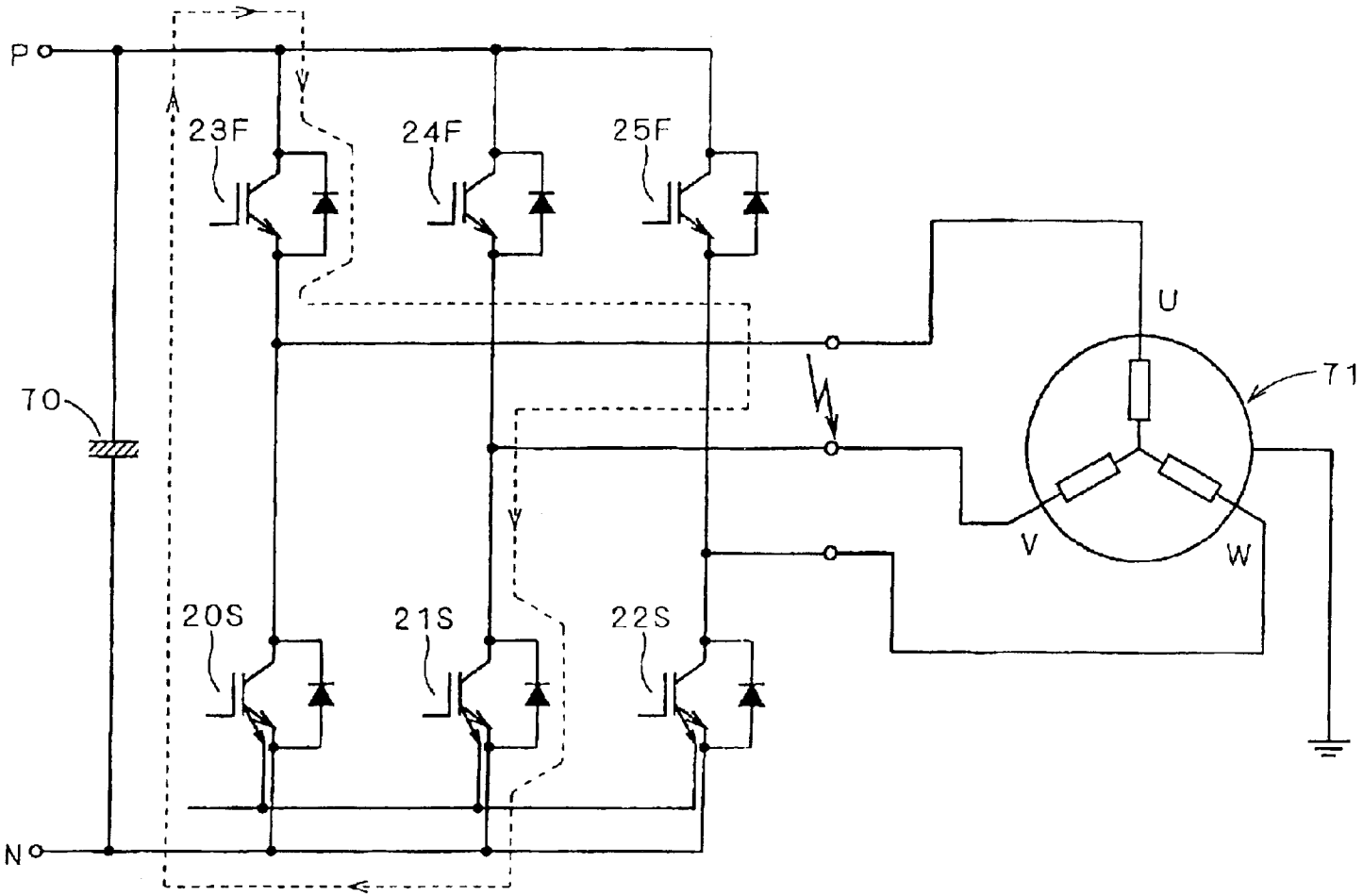
Figure 12:
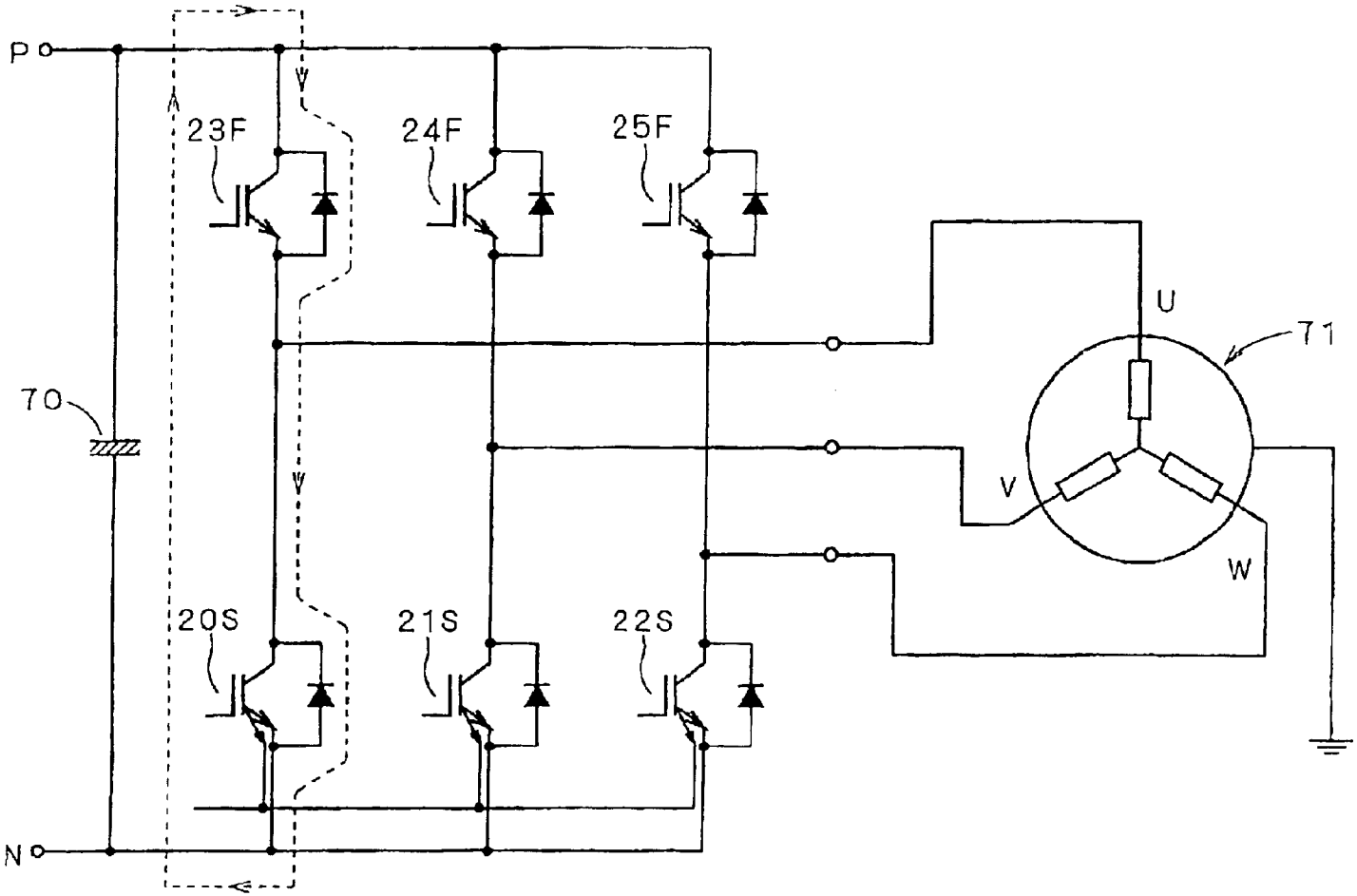

FIGS. 8 to 12 are circuit diagrams showing still another operation pattern in accordance with this preferred embodiment of the present invention, and use the same representtion as FIG. 2. Both FIGS. 8 and 9 show a case where a partial short circuit is caused between the U-phase and the V-phase. FIG. 8 shows a case where a current flows from the U-phase to the V-phase and W-phase; and FIG. 9 shows a case where a current flows from the U-phase and V-phase to the W-phase. FIGS. 10 and 11 show two cases of short circuits between the U-phase and the V-phase (a short circuit inside the load 71 i.e., an arm-windings-short, and a short circuit between terminals connecting the load 71 and the inverter 1c, i.e., a terminals-short). FIG. 12 shows a short circuit inside the inverter 1c, i.e., an arm-short-through.

In the case of FIGS. 8 and 9, the load 71 is substantially a non-equilibrium load. In FIG. 8, even if currents of 10 amperes and 20 amperes flow in the transistors 21S and 22S, respectively, for example, and the respective amounts of currents flowing in the transisors 21S and 22S are appropriate, a current flowing in the transistors 21S and 22S are appropriate,a current flowing in the transistor 23F is 30 amperes. In such a case, like in the case of FIG. 2, it is possible to detect that the overcurrent flows in any one of the transistors and turn off, for example, all the transistors at least on the "L" side. Similarly, in the case of FIG. 9 for example, when currents of 20 amperes and 10 amperes flow in the transistors 23F and 24F, respectively, and a current flowing in the transistor 22S is 30 amperes, it is naturally possible to perform such a control as to turn off the transistor 22S.

In both the cases of FIGS. 10 and 11, since overcurrents flow in the transistors 23F and 21S equally, it is possible to perform such a control as to turn off the transistor 21S. In the case of FIG 12, since overcurrents flow in the transistors 23F and 20S equally, it is possible to perform such a control as to turn off the transistor 20S.

Figure 13:
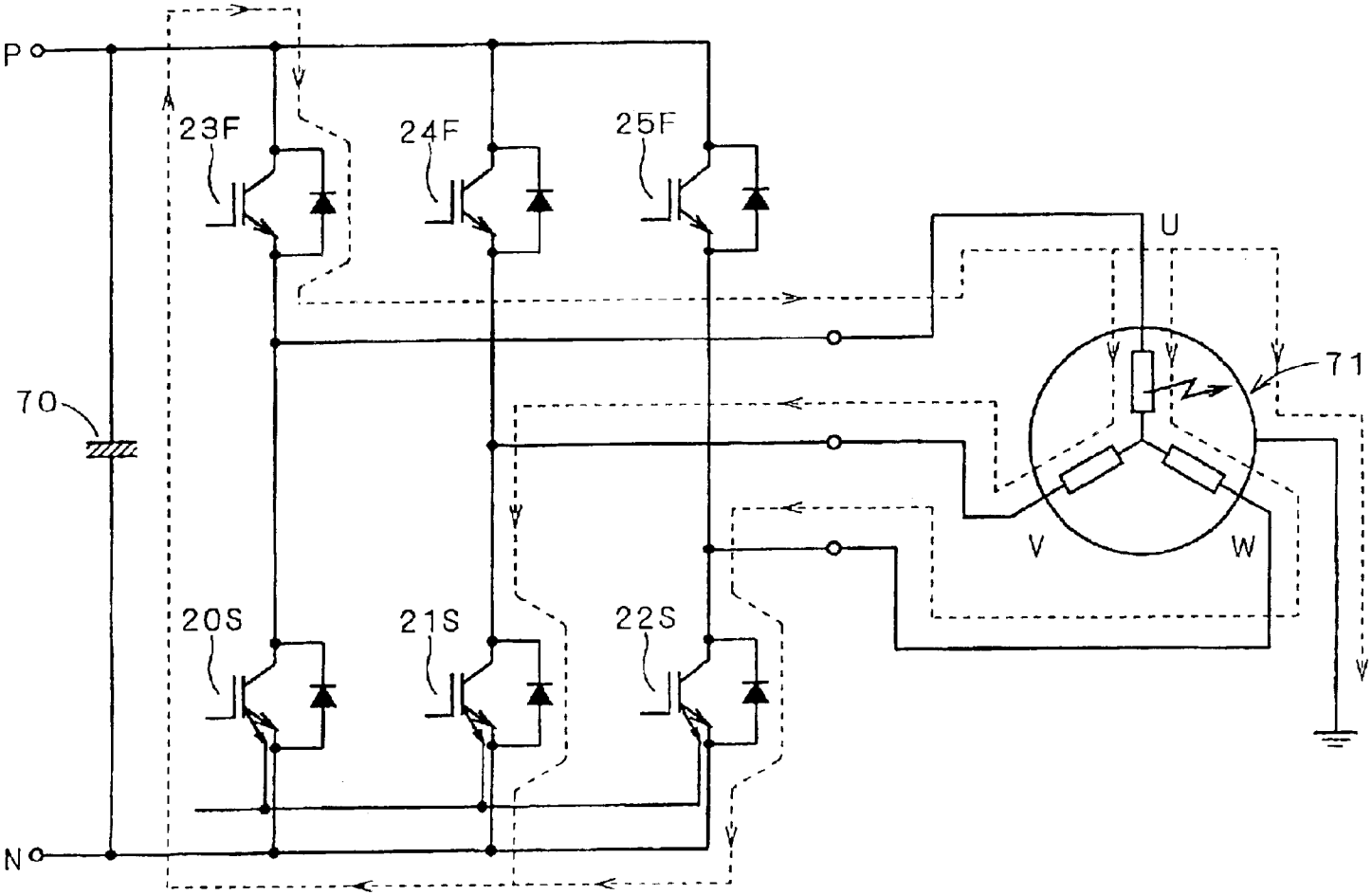
Figure 14:
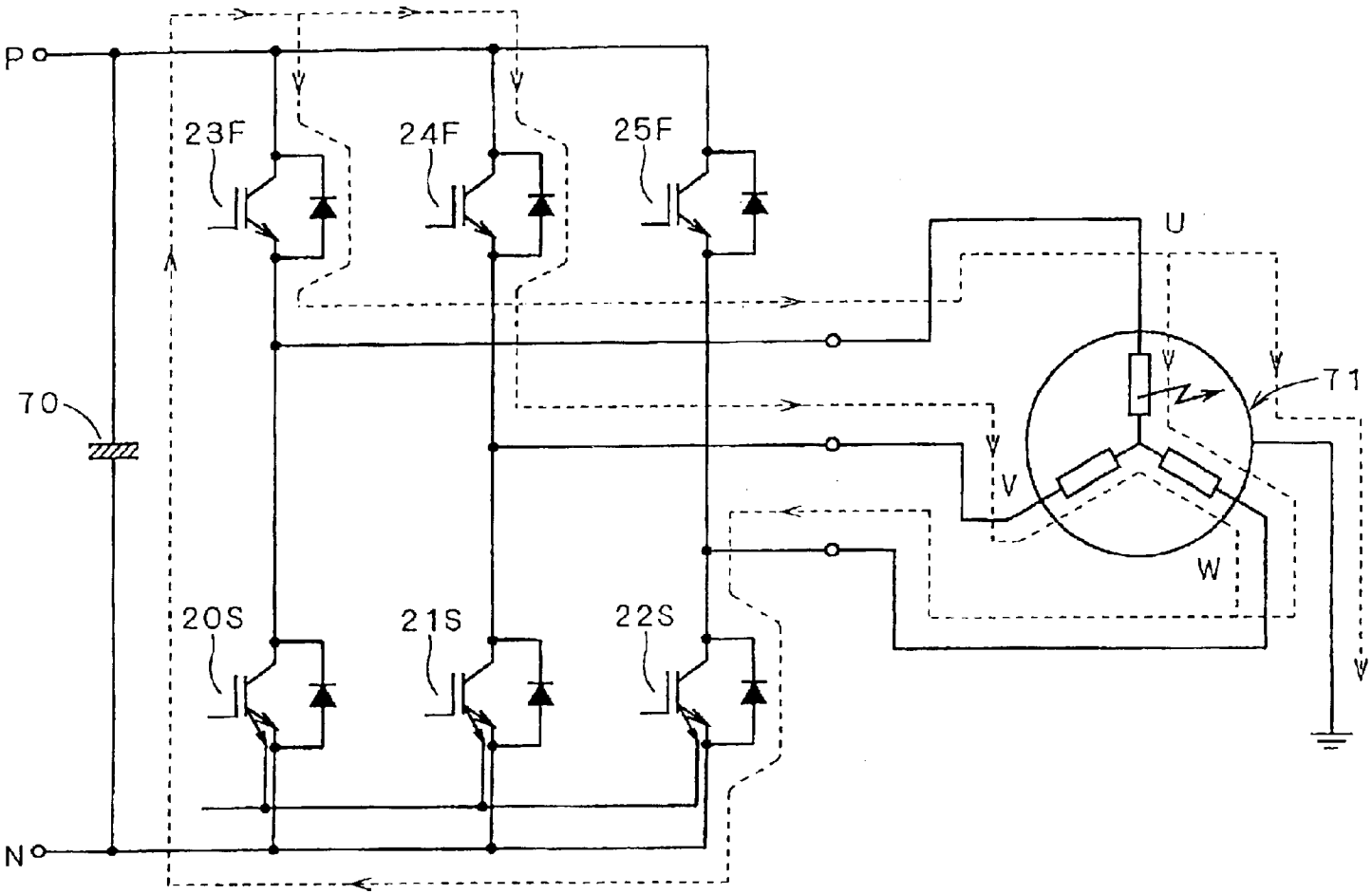
Figure 15:
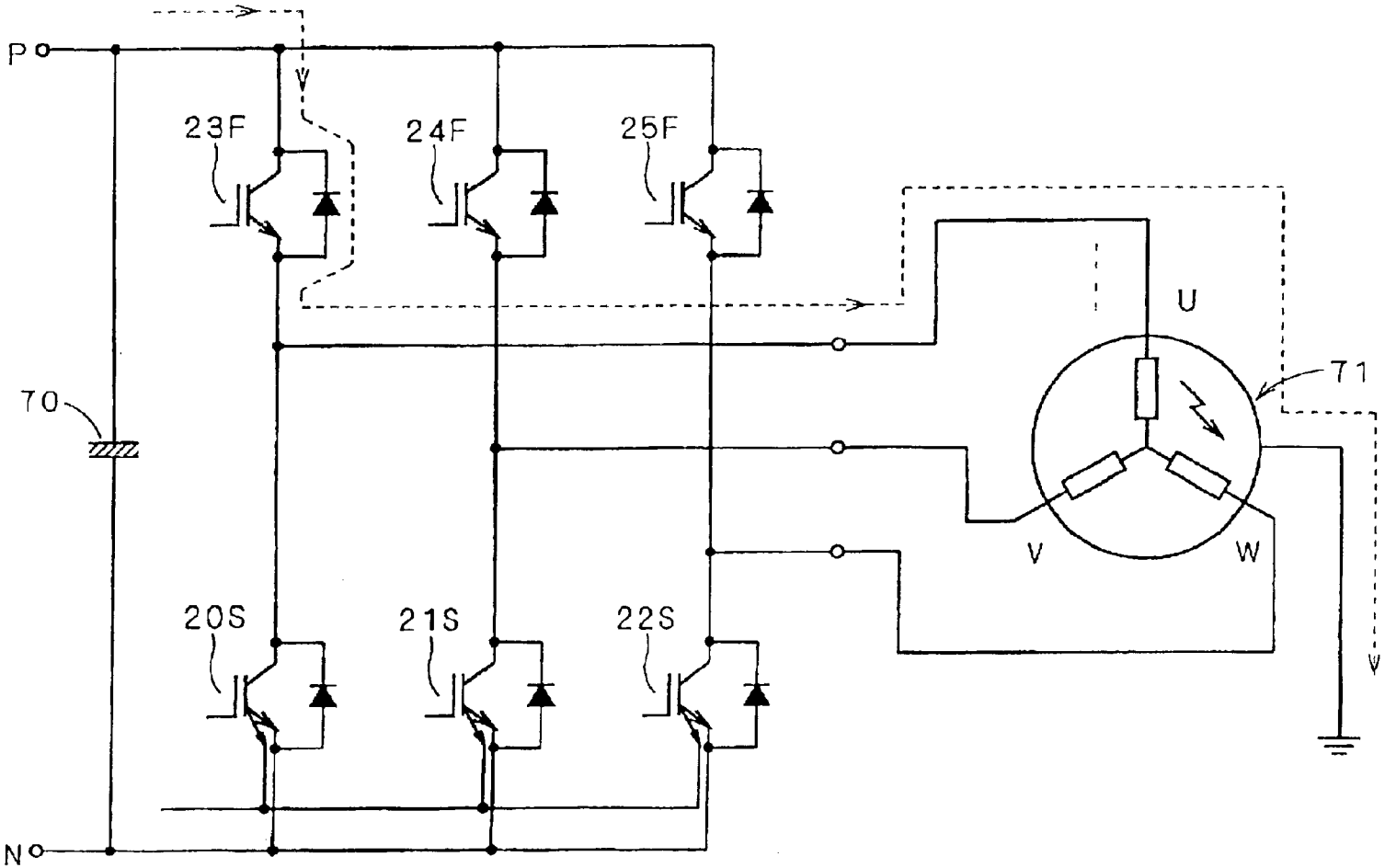

FIGS. 13 to 15 show a case where the U-phase in the load 71 is ground-shorted. FIGS. 13 and 14 show a case where the U-phase part of the load 71 is partially ground-shorted through a case of the load 71, and FIG. 15 shows a case where the U-phase part of the load 71 is directly ground-shorted. FIG.13 shows a case where a current flows from the U-phase to the V-phase and W-phase, and FIG. 14 shows a case where a current flows from the U-phase and V-phase to the W-phase.

In these cases, unfortunately, failures can not be always detected. That is because part of the overcurrent flows to the ground due to the ground short and the current flowing in the resistor 30s in the controller 10c does not reflect the sum of the currents flowing in the transistors on the "L" side or the sum of the currents flowing in the transistors on the "H" side. For example, to FIG. 13, even when a current of 30 amperes flows in the transistor 23F, if a ground-short current of 10 amperes flows, the sum of the currents flowing in the transistors 21S and 22S is 20 amperes and therefore it is impossible to detect that an overcurrent is produced. Further, in FIG. 14, when the ground-short current is 10 amperes, even if the sum of the currents flowing in the transistors 23F and 24F is 30 amperes, only a current of 20 amperes flows in the transistor 22S and no overcurrent is produced, and therefore it is imposible to detect a ground short. Furthermore, in FIG. 15, when an overcurrent flows in the transistor 23F on the "H" side, if the whole current flows into the ground, no current flows in any transistor on the "L" side and therefore it is impossible to detect that an overcurrent is produced.

The difficulty in failure detection due to the existence of ground-short current is, however, not specific to the configuration of the present invention and is found in the technique to detect an overcurrent by the DC bus detection system. In other words, the configuration of the present invention does not inevitably cause a faulty operation which has not been caused in the background art.

The Second Preferred Embodiment

Figure 16:
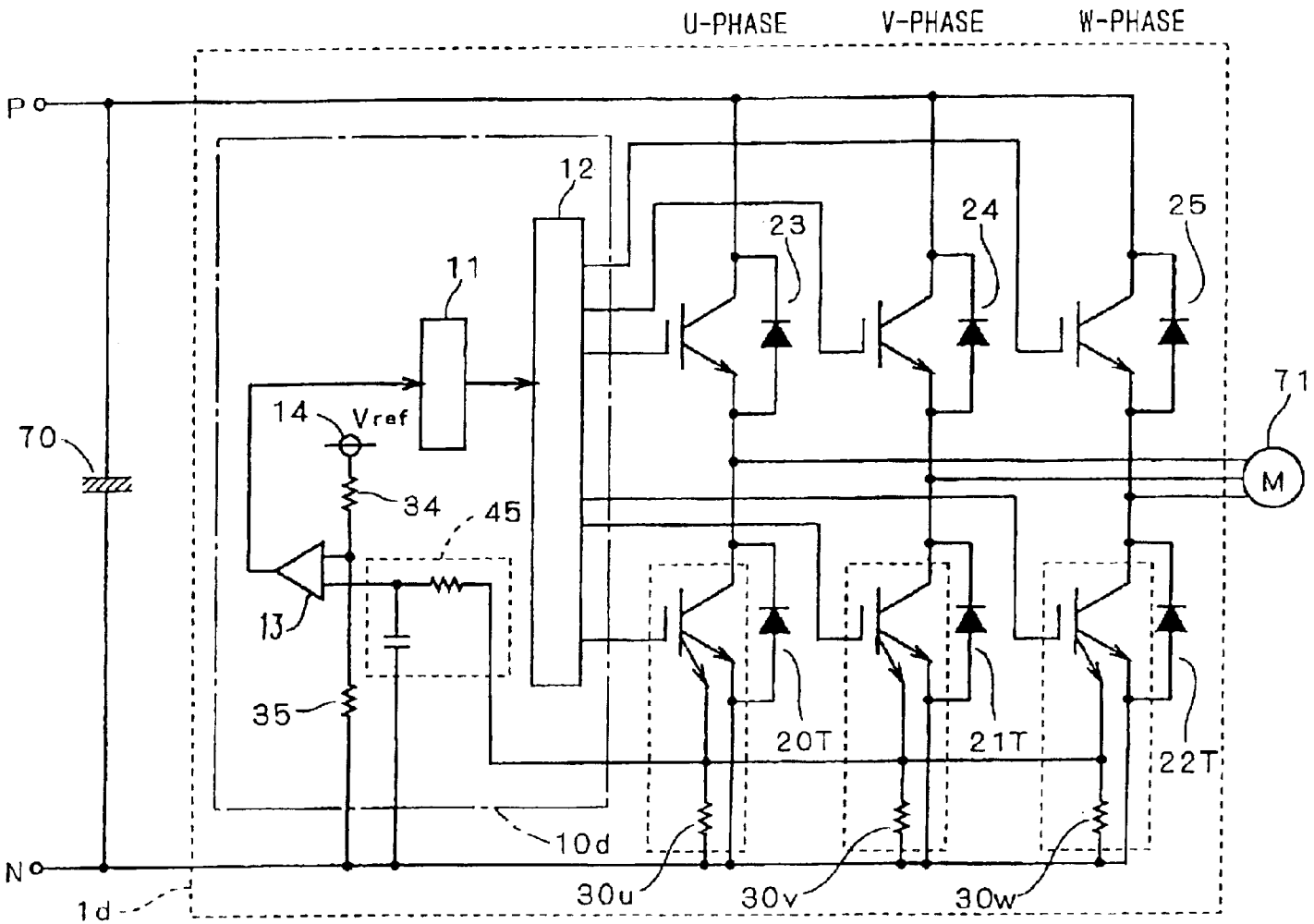
FIG. 16 is a circuit diagram showing a configuration of an inverter circuit in accordance with a second preferred embodiment of the present invention.

FIG. 16 is a circuit diagram showing a configuration of an inverter circuit [id] *1d* in accordance with the second preferred embodiment of the present invention. As compared with the inverter circuit 1c of FIG. 1, the transistors 20S, 21S and 22S are replaced by transistors 20T, 21T and 22T, respectively. Further, the controller 10c is replaced by a controller 10d, and the controller 10d has a configuration in which the resistor 30s is removed from the controller 10c.

The transistors 20T, 21T and 22T have configurations in which the resistors 30u, 30v and 30w are additionally incorporated in the transistors 20S, 21S and 22S, respectively. The resistors 30u, 30v and 30w are interposed between current detection terminals of the transistors 20T, 21T and 22T and the terminal N. Therefore, equivalently, it can be considered that the resistor 30s is replaced by a parallel connection of the three resistors 30u, 30v and 30w.

As discussed in the first preferred embodiment, the loss across the resistor 30s is [not larger than] *smaller than that of* the resistor 30 in the background art as shown in FIG. 20. Therefore, the resistors 30u, 30v and 30w can be integrated together with the transistors 20T, 21T and 22T.

Configured as above, this preferred embodiment produces an effect of making the configuration of the controller 10d simpler than that of the controller 10c as well as the effect of the first preferred embodiment.

The Third Preferred Embodiment

Figure 17:
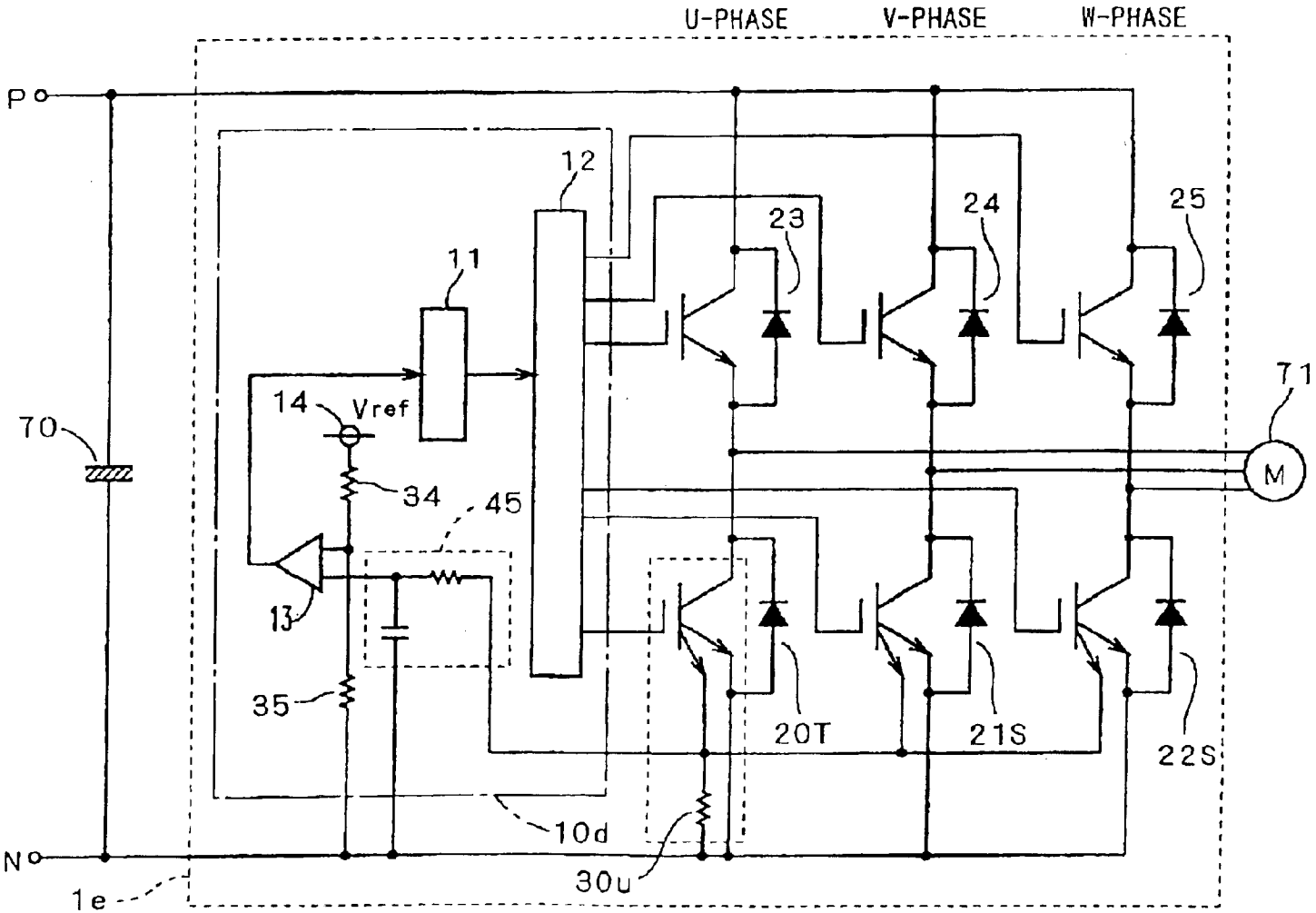
FIG. 17 is a circuit diagram showing a configuration of an inverter circuit in accordance with a third preferred embodiment of the present invention.

FIG. 17 is a circuit diagram showing a configuration of an inverter circuit 1e in accordance with the third preferred embodiment of the present invention. As compared with the inverter circuit 1d of FIG. 16, the transistors 21T and 22T are replaced by the transistors 21S and 22S, respectively. Therefore, as compared with the inverter circuit 1c of the first preferred embodiment, it can be considered that the resistor 30s is incorporated in the transistor 20T as the resistor 30u. It is obvious that this configuration produces the effect of the second preferred embodiment.

The Fourth Preferred Embodiment

Figure 18:
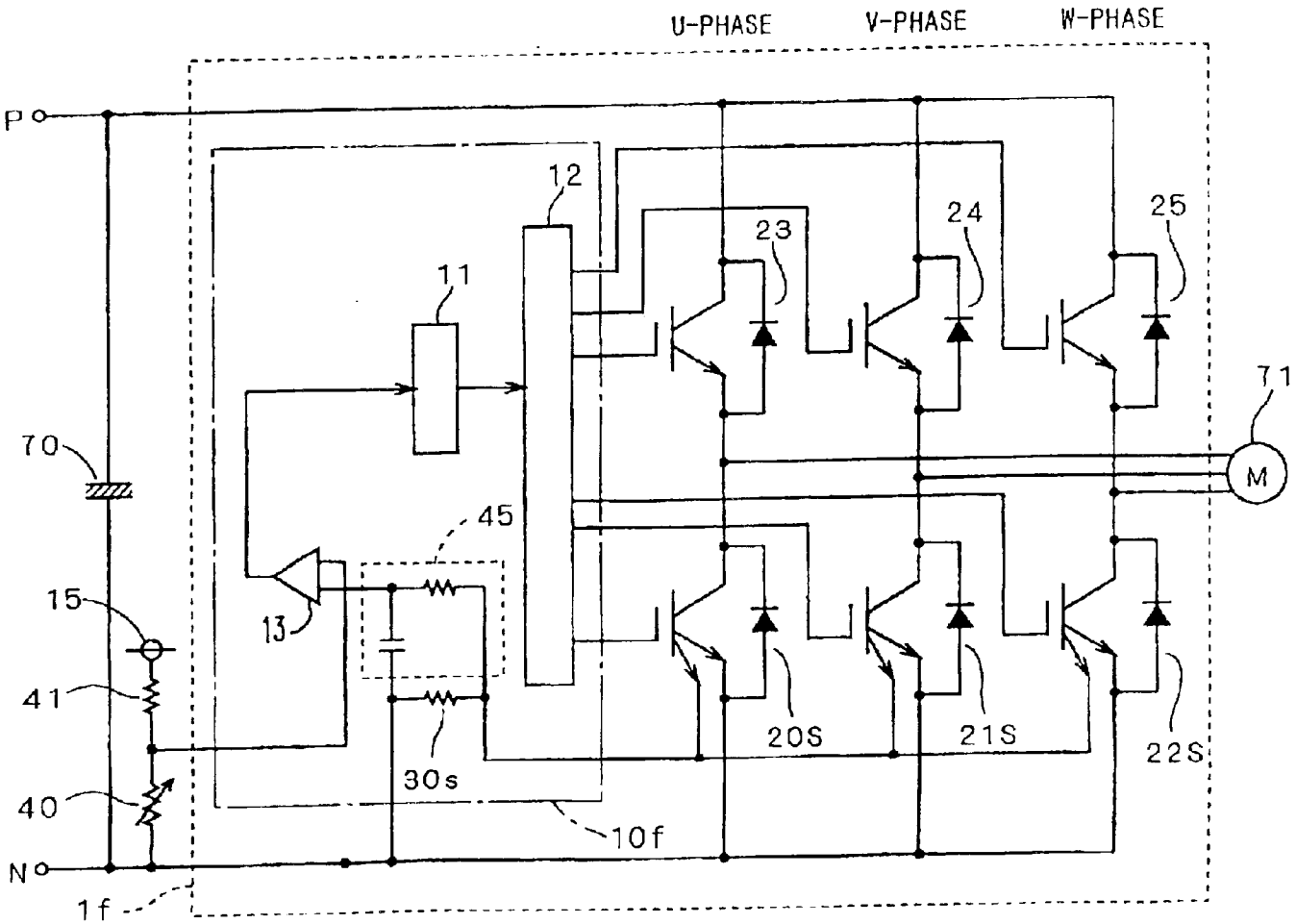
FIG. 18 is a circuit diagram showing a configuration of an inverter circuit in accordance with a fourth preferred embodiment of the present invention.

FIG. 18 is a circuit diagram showing a configuration of an inverter circuit 1f in accordance with the fourth preferred embodiment of the present invention. As compared with the inverter circuit 1c of FIG. 1, the controller 10c is replaced by a controller 10f and the controller 10f has a configuration in which the power supply 14 and the resistors 34 and 35 are removed from the controller 10c.

Instead of the removed power supply 14 and resistors 34 and 35, variable [resistors] *resistor* 40 and *resistor* 41 for dividing a voltage supplied from an external power supply 15 and applying the divided voltage to the comparator 13 are provided outside the inverter circuit 1f.

Thus, supplying a reference voltage for overcurrent detection from the outside of the controller 10f allows an additional advantage that the above reference voltage can be externally controlled by the variable resistor 40 according to the characteristics of the inverter circuit [if] *1f* even if the controller 10f is integrated.

It is natural that also in the first to third preferred embodiments, it is possible to adapt the reference voltage to the characteristics of the inverter circuits 1c to 1e by appropriately setting the resistance values of the resistors 34 and 35.

The Fifth Preferred Embodiment

Figure 19:
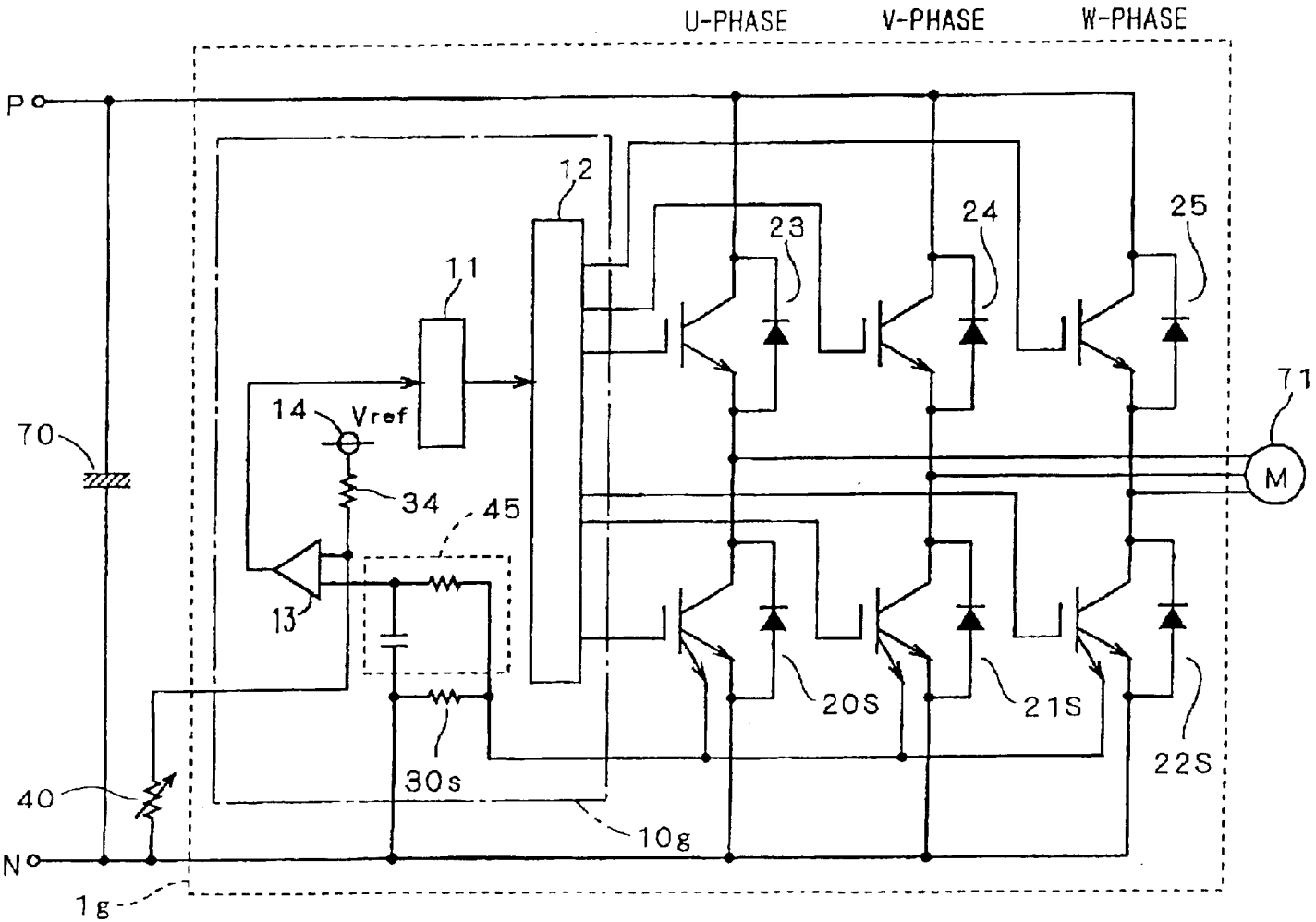
FIG. 19 is a circuit diagram showing a configuration of an inverter circuit in accordance with a fifth preferred embodiment of the present invention.

FIG. 19 is a circuit diagram showing a configuration of an inverter circuit 1g in accordance with the fifth preferred embodiment of the present invention. As compared with the inverter circuit 1c of FIG. 1, the controller 10c is replaced by a controller 10g and the controller 10g has a configuration in which the resistor 35 is removed from the controller 10c.

Instead of the removed resistor 35, the varible resistor 40 is provided outside the inverter circuit 1g, and the voltage Vref supplied from the power supply 14 is divided by the resistor 34 and the variable resistor 40 and applied to the comparator 31.

Thus, providing the variable resistor 40 for controlling the reference voltage for overcurrent detection outside the control circuit log allows an additional advantage that the above reference voltage can be controlled according to the characteristics of the inverter circuit 1g even if the controller 10g is integrated.

Further, it is natural that it is possible to combine the first the third preferred embodiments with the contents of the fourth and fifth preferred embodiments.

While the invention has been shown and described in detail, the foregoing description is in all aspects illustrative and not restrictive. It is therefore understood that numerous modifications and variations can be devised without departing from the scope of the invention.

What is claimed is:

1. An inverter circuit connected to first and second terminals which are given a substantially-direct current, said inverter circuit supplying polyphase power, comprising:

a plurality of switching elements on a first side, each including a first end connected to said first terminal, a second end and a regenerative current element provided between said first and second ends;

a plurality of switching elements on a second side, each including a first end, a second end connected to said second terminal, a regenerative current element provided between said first and second ends thereof and a current detection terminal for detecting a current flowing therein;

a resistive device developing a voltage drop by a sum of currents flowing in said [second ends] *current detection terminals* of said plurality of switching elements on said second side; and a driving circuit for controlling a driving operation on said plurality of switching elements on said second side on the basis of a comparison result between said voltage drop and a predetermined voltage, wherein said second ends of said plurality of switching elements on said first side and said first ends of said plurality of switching elements on said second side are connected to output said polyphase power.

2. The inverter circuit according to claim 1, wherein said resistive device and said driving circuit are integrated.

3. The inverter circuit according to claim 1, wherein said resistive device is integrated with at least one of said plurality of switching elements on said second side.

4. The inverter circuit according to claim 3, wherein said resistive device is integrated with one of said plurality of switching elements on said second side.

5. The inverter circuit according to claim 3, wherein said resistive device consists of a plurality of resistive elements connected in parallel as many as said plurality of switching elements on said second side, and said plurality of resistive elements are integrated with said plurality of switching elements on said second side, respectively.

6. The inverter circuit according to claim 1, further comprising:

a comparator for comparing said voltage drop with said predetermined voltage.

7. The inverter circuit according to claim 6, further comprising:

a filter for giving said voltage drop with noise cut to said comparator.

8. The inverter circuit according to claim 7, wherein said filter is integrated with said comparator.

9. The inverter circuit according to claim 7, wherein said filter is integrated with said driving circuit.

10. The inverter circuit according to claim 6, further comprising:

a power supply, wherein said predetermined voltage is divided by second and third resistive devices and applied to said comparator.

11. The inverter circuit according to claim 10, wherein said second and third resistive devices are integrated with said comparator.

12. The inverter circuit according to claim 10, wherein said second resistive device is externally provided.

13. The inverter circuit according to claim 12, wherein the resistance value of said second resistive device is variable.

14. The inverter circuit according to claim 12 wherein said third resistive device is externally provided.

* * * * *